United States Patent
Lisinski et al.

(10) Patent No.: US 8,859,939 B2
(45) Date of Patent: Oct. 14, 2014

(54) ELECTRICALLY HEATABLE CARRIER AND PANEL RADIATOR, AND METHOD FOR THE PRODUCTION THEREOF

(75) Inventors: Susanne Lisinski, Cologne (DE); Dang Cuong Phan, Aachen (DE); Guenther Schall, Kreuzau (DE); Marcel Klein, Baesweiler (DE); Sabine Velden, Inden (DE)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 14/110,906
(22) PCT Filed: Mar. 27, 2012
(86) PCT No.: PCT/EP2012/055439
§ 371 (c)(1), (2), (4) Date: Dec. 18, 2013
(87) PCT Pub. No.: WO2012/139884
PCT Pub. Date: Oct. 18, 2012

(65) Prior Publication Data
US 2014/0091074 A1 Apr. 3, 2014

(30) Foreign Application Priority Data
Apr. 12, 2011 (EP) .................................... 11162131
Apr. 12, 2011 (EP) .................................... 11162134

(51) Int. Cl.
*B60L 1/02* (2006.01)
*H05B 3/02* (2006.01)
(Continued)

(52) U.S. Cl.
CPC ................ *B60S 1/026* (2013.01); *F24D 13/02* (2013.01); *H05B 3/84* (2013.01);
(Continued)

(58) Field of Classification Search
CPC ......... A47C 7/748; B60S 1/026; F24D 13/02; H01C 17/06; H05B 2203/003; H05B 2203/007; H05B 2203/016; H05B 3/16; H05B 3/34; H05B 3/84
USPC ......... 219/203, 212–214, 217, 522, 527–529, 219/538–549
See application file for complete search history.

(56) References Cited

U.S. PATENT DOCUMENTS 3,427,712 A * 2/1969 Witdoeckt ...................... 29/611
(Continued)

FOREIGN PATENT DOCUMENTS

DE 19860870 7/2000
(Continued)

OTHER PUBLICATIONS

1—Written Opinion for PCT Application PCT/US2013/055439 filed on Mar. 27, 2012. Mail Date: Jul. 9, 2013 (German Original+English Translation).
(Continued)

*Primary Examiner* — Sang Y Paik
(74) *Attorney, Agent, or Firm* — Steinfl & Bruno LLP (57) ABSTRACT

A carrier, in particular a plastic film, comprising an electrical heating layer is described. The heating layer is applied to at least a portion of a carrier surface. The heating layer is electrically divided by one or more first separating zones, each of which is designed such that a current path changes the direction of flow thereof at the free zone ends, and one or more second separating zones, which are designed such that the current path changing the direction of flow thereof at the free zone ends is divided in at least some sections into a plurality of electrically parallel current sub-paths. One or more second separating zones are associated with at least one free zone end of a first separating zone, with the second separating zones arranged in an aligned extension to the first separating zone.

15 Claims, 4 Drawing Sheets

(51) Int. Cl.
*F24D 13/02* (2006.01)
*H05B 3/84* (2006.01)
*H05B 3/16* (2006.01)
*B60S 1/02* (2006.01)
*H01C 17/02* (2006.01)
*H05B 3/26* (2006.01)
*A47C 7/74* (2006.01)
*H05B 3/34* (2006.01)
*H01C 17/06* (2006.01)

(52) U.S. Cl.
CPC ............ *H05B 2203/016* (2013.01); *H05B 3/16* (2013.01); *H05B 2203/003* (2013.01); *H05B 2203/007* (2013.01); *H05B 2203/013* (2013.01); *H01C 17/02* (2013.01); *H05B 3/265* (2013.01); *A47C 7/748* (2013.01); *H05B 3/34* (2013.01); *H01C 17/06* (2013.01)
USPC .......................................... 219/203; 219/539

(56) References Cited

U.S. PATENT DOCUMENTS

| | | | | |
|---|---|---|---|---|
| 3,749,886 | A | * | 7/1973 | Michaelsen .................... 219/528 |
| 4,016,645 | A | * | 4/1977 | Cooke .............................. 29/611 |
| 4,251,316 | A | | 2/1981 | Smallbone |
| 4,468,557 | A | * | 8/1984 | Bylin et al. .................... 219/535 |
| 2005/0221062 | A1 | | 10/2005 | Mann |

FOREIGN PATENT DOCUMENTS

| | | |
|---|---|---|
| DE | 10208552 | 9/2003 |
| DE | 102004029164 | 12/2005 |
| DE | 102007004953 | 7/2008 |
| DE | 102008018147 | 10/2009 |
| DE | 102008029986 | 1/2010 |
| FR | 2592544 | 7/1987 |
| WO | 2006/010698 | 2/2006 |

OTHER PUBLICATIONS

2—International Preliminary Report on Patentability for PCT Application PCT/US2013/055439 filed on Mar. 27, 2012. Mail Date: Oct. 15, 2013 (German Original+English Translation).
3—Written Opinion for PCT Application PCT/US2013/055436 filed on Mar. 27, 2012. Mail Date: Jun. 8, 2013 (German Original+English Translation).
4—International Preliminary Report on Patentability for PCT Application PCT/US2013/055436 filed on Mar. 27, 2012. Mail Date: Oct. 15, 2013 (German Original+English Translation).
PCT International Search Report mailed on Jun. 8, 2012 for PCT Application PCT/EP2012/055436 filed on Mar. 27, 2012 in the name of Saint-Gobain Glass France.
PCT International Search Report mailed on Jul. 9, 2012 for PCT Application PCT/EP2012/055439 filed on Mar. 27, 2012 in the name of Saint-Gobain Glass France.

* cited by examiner

ELECTRICALLY HEATABLE CARRIER AND PANEL RADIATOR, AND METHOD FOR THE PRODUCTION THEREOF

CROSS REFERENCE TO RELATED APPLICATIONS

The present application is the US national stage of International Patent Application PCT/EP2012/055439 filed on Mar. 27, 2012 which, in turn, claims priority to European Patent Applications EP 11162134.8 and EP 11162131.4, both filed on Apr. 12, 2011.

Panel heating elements with a substrate and an electrical heating layer are well known per se and have already been described many times in the patent literature. Reference is made merely by way of example in this regard to the German published patent applications DE 102008018147 A1 and DE 102008029986 A1. In motor vehicles, they are often used as windshields since, by law, the central visual field of windshields must have no substantial vision restrictions.

From the industrial series production of panel heating elements, the structuring of the heating layer by means of separating lines to form a usually winding current path is known. This has the advantage that the electrical resistance increases and the current path can be contacted by means of relatively small connection electrodes. In the patent literature, such a panel heating element is, for example, described in the German published application DE 19860870 A1.

With such panel heating elements, the problem occurs that in the region of a curve of the current path, the current distribution becomes inhomogeneous and local heat centers ("hot spots") can develop. These hot spots cause a nonuniform heat distribution in the panel heating element and can result, due to local overheating, in impairment and possibly even damage to the heating layer or the substrate. Moreover, with transparent panes, visual perception through the pane at the overheating points can be impaired.

A solution to this problem is disclosed in the American patent application US 2005/221062 A1. According to it, arc-shaped curved guiding lines are provided at the free ends of the separating lines, by means of which the current path is divided into a plurality of parallel current subpaths.

In contrast, the object of the present invention consists in counteracting the occurrence of local heat centers or preventing them. This and other objects are accomplished according to the proposal of the invention by means of a carrier, a panel heating element produced therewith, and a method for producing such a carrier with the characteristics of the coordinated claims. Advantageous embodiments of the invention are indicated by the characteristics of the subclaims.

According to the invention, a carrier, in particular a plastic film, is presented, in which an electrical heating layer to heat the carrier is applied on at least a part of a carrier or film surface. The carrier or film can be made from any plastic suitable for the application, for example, from polyamide (PA), polyurethane (PU), polyvinyl chloride (PVC), polycarbonate (PC), polyester (PE), polyvinyl butyral (PVB), or polyethylene terephthalate (PET). It also has at least two electrodes provided for connection to the voltage source that are connected to the heating layer such that a (main) current path for a heating current is formed between the electrodes. The heating layer is electrically divided in sections by one or a plurality of first separating zones, with each first separating zone having at least one ("free") zone ending freely inside the heating layer. The one or a plurality of first separating zones are implemented such that, in each case, the (main) current path changes its direction of flow on the free zone ends, for example, by 180°. Preferably, but not mandatorily, the first separating zones are implemented as separating lines, linearly, in particular rectilinearly. In addition, one or a plurality of second separating zones are implemented in the heating layer, which, in each case, electrically divide the heating layer in sections and are implemented such that the (main) current path changing its direction of flow on the free zone ends is divided at least in sections into a plurality of electrically parallel current subpaths. The (main) current path is thus divided on the free zone ends, at least in a current path section changing its direction of flow, into current subpaths. Thus, the heating current can be guided around the free zone end, at least in sections, in current subpaths. Here, one or a plurality of second separating zones are, in each case, associated with the same free zone end of a first separating zone, with, for this purpose, one or a plurality of second separating zones arranged, in each case, near or adjacent the associated free zone end.

According to the invention, one or a plurality of second separating zones are associated with a free zone end of a preferably rectilinear first separating zone, which second separating zones are in each case arranged in an aligned extension of the first separating zone. Preferably, but not mandatorily, the second separating zones are implemented as separating lines linearly, in particular rectilinearly. By means of this measure, the second separating zones can be produced in a particularly advantageous manner in one and the same process step as the first separating zones, by which means the production of the carrier in series production is significantly simplified. If, for example, a heating-layer-removing laser is used to produce the first and second separating zones, it is merely necessary to guide the laser, for example, rectilinearly over of the heating layer and to vary the electrical power appropriately such that the first separating zone and the associated second separating zones can be produced in one and the same translatory motion of the laser head.

By means of the division of the (main) current paths into a plurality of current subpaths, a spatial homogenization of the current density in the region of the change in the direction of flow of the (main) current paths can be obtained, in order, in this manner, to counteract the creation of local heat centers or hot spots.

It is particularly advantageous for the separating zones to have a distance between them that becomes smaller toward the free zone end. By this measure, a particularly effective homogenization of the current flow in the curved current path can be obtained in order to homogenize the heat distribution.

In another advantageous embodiment of the carrier, one or a plurality of second separating zones are associated with at least one (and the same) free zone end, with the second separating zones implemented such that the current subpaths have, on the free zone end, an at least approx. equal electrical resistance. By this measure, it can advantageously be achieved that the current is uniformly divided on the current subpath such that there is a particularly homogeneous current density distribution and heat distribution in the carrier.

In another advantageous embodiment of the carrier, a transition zone, in which the electrical conductivity of the heating layer decreases toward the free zone end, i.e., decreases to zero, adjoins the free zone end of the at least one first separating zone, with which one or a plurality of second separating zones are associated. Preferably, but not mandatorily, the transition zone is implemented such that the electrical conductivity of the heating layer decreases continuously, in particular linearly, toward the free zone end. Preferably, but not mandatorily, the transition zones are in each case implemented linearly, in particular rectilinearly. By means of this measure, advantageously, through a spatial variation of the electrical resistance of the heating layer, a further homogenization of the current flow in the region of a curve of the current path on the free zone ends is made possible.

At the beginning of the transition zone, the electrical conductivity is zero. The end of the transition zone is constituted by the region in which the increasing electrical conductivity has reached the full electrical conductivity of the heating layer. The second separating zones associated with the free separating zones are arranged distributedly in the region of the transition zone. The end of the second separating zone farthest away from the free zone end turned away from the free zone end is situated at the end of the transition zone.

In an advantageous embodiment, the transition zones are implemented such that a layer thickness of the heating layer varies. Here, the layer thickness of the heating layer decreases toward the free zone end or increases away from the free zone end. The beginning of the transition zone is defined by the free zone end on which the layer thickness of the heating layer is zero. The end of the transition zone is defined by reaching the full layer thickness of the heating layer. Preferably, but not mandatorily, the transition zone is implemented such that the layer thickness of the heating layer decreases continuously, in particular linearly, toward the free zone end.

In another advantageous embodiment, a porosity of the heating layer increases toward the free zone end, such that, correspondingly, a decrease in the electrical conductivity can be achieved.

In another advantageous embodiment, in which the heating layer has a dopant to increase the electrical conductivity, the transition zones are implemented such that a concentration of the dopant in the transition zone decreases toward the free zone end such that, correspondingly, a decrease in the electrical conductivity can be achieved.

In an advantageous embodiment, the transition zone has, on one free zone end, a length that corresponds to at least half of the width of the current path on the free zone end measured perpendicular to its length, by means of which a particularly good homogenization of the current flow can be achieved.

The invention further extends to a panel heating element with at least one substrate with a substrate surface on which a plastic film as described above for heating the substrate is applied. The panel heating element can, in particular, be a composite pane in which two individual panes are bonded to each other by an adhesive layer.

The invention further extends to a method for producing an electrically heatable carrier implemented as described above, in particular a plastic film, with the following steps:

Provision of the carrier, on which an electrical heating layer is applied on at least a part of a film surface and which has at least two electrodes provided for connection to a voltage source, which electrodes are connected to the heating layer such that a current path for a heating current is formed between the electrodes;

Electrical division of the heating layer by one or a plurality of first separating zones, with the separating zones having, in each case, at least one free zone end and being implemented such that the current path changes its direction of flow at the free zone ends, and;

Electrical division of the heating layer by one or a plurality of second separating zones, which are implemented such that the current path changing its direction of flow on the free zone ends is divided at least in sections into a plurality of electrically parallel current subpaths, wherein one or a plurality of second separating zones are associated with at least one free zone end of a rectilinear first separating zone, with the second separating zones arranged in an aligned extension of the first separating zone.

The invention further extends to the use of a carrier as described above for the electrical heating of a functional individual piece and a built-in part in furniture, devices, and buildings, in particular for the electrical heating of heating elements in residential spaces, for example, as wall-mountable or freestanding heating elements, as well as in means of transportation for travel on land, in the air, or on water, in particular in motor vehicles, for example, as a windshield, rear window, side window, and/or glass roof.

It is understood that the various embodiments of the invention can be realized individually or in any combinations. In particular, the aforementioned characteristics and those to be explained in the following can be used not only in the combinations indicated, but also in other combinations or alone, without departing from the scope of the present invention.

BRIEF DESCRIPTION OF THE DRAWINGS

The invention is now explained in detail using exemplary embodiments with reference to the accompanying figures. They depict, in simplified, not to scale representation:

FIG. 3 A-3B the plastic film of FIG. 2 with a sketched-in current path in a top view (FIG. 3 A) as well as a conventional plastic film without transition zones (FIG. 3B);

DETAILED DESCRIPTION OF THE DRAWINGS

Figure 4:
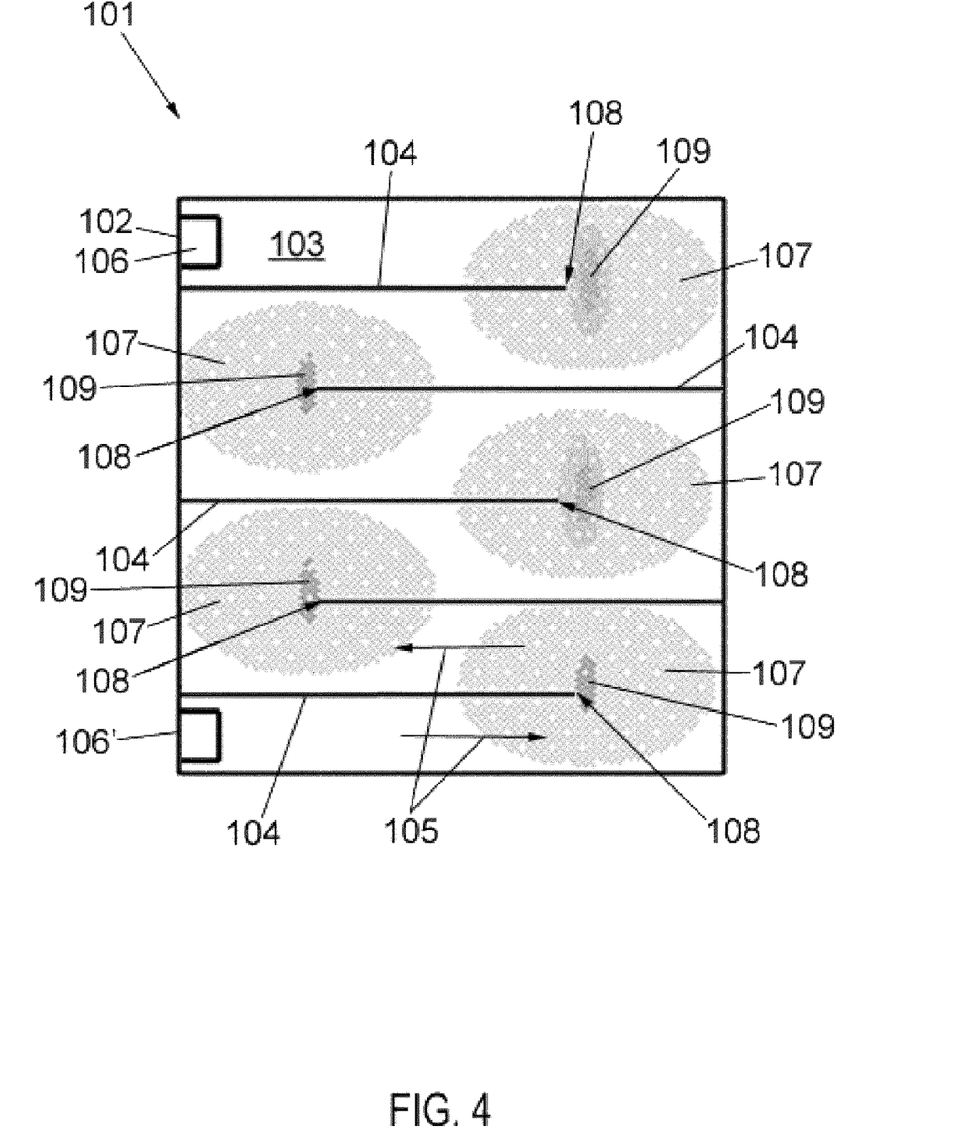
FIG. 4 a conventional plastic film with representation of local hot spots in a top view.

Reference is first made to FIG. 4, in which a plastic film according to the prior art, referenced as a whole by the reference number 101, is depicted. The plastic film 101 comprises a film surface 102, onto which an electrical heating layer 103 is applied. The heating layer 103 is electrically separated by rectilinear separating zones 104 such that a continuous meander-shaped or S-shaped structure is formed, which is electrically connected on both its ends to the two connection electrodes 106, 106'. Between the two connection electrodes 106, 106', a winding current path 105 is formed for a heating current fed to the connection electrodes 106, 106', by which heating current the heating layer 103 is heated. The separating zones 104 have, in each case, a free zone end 108 in the heating layer 103.

In change zones 107, in which, in each case, a freely ending zone end 108 of a separating zone 104 is contained, the heating current reverses its direction of flow several times by 180°. Accordingly, in the change zones 107, the current path 105 has a curved course, by means of which a nonuniform current density distribution with a concentration of the current flow on the zone ends 108 results. This typically leads to the occurrence of locally overheated sites or hot spots 109 on the zone ends 108.

The present invention solves this problem in that it homogenizes the distribution of the current flow in the regions of a curve of the current path such that a concentration of the current flow at the reversal sites of the current path is at least to a large extent avoided. This is explained in detail hereinafter.

Figure 1:
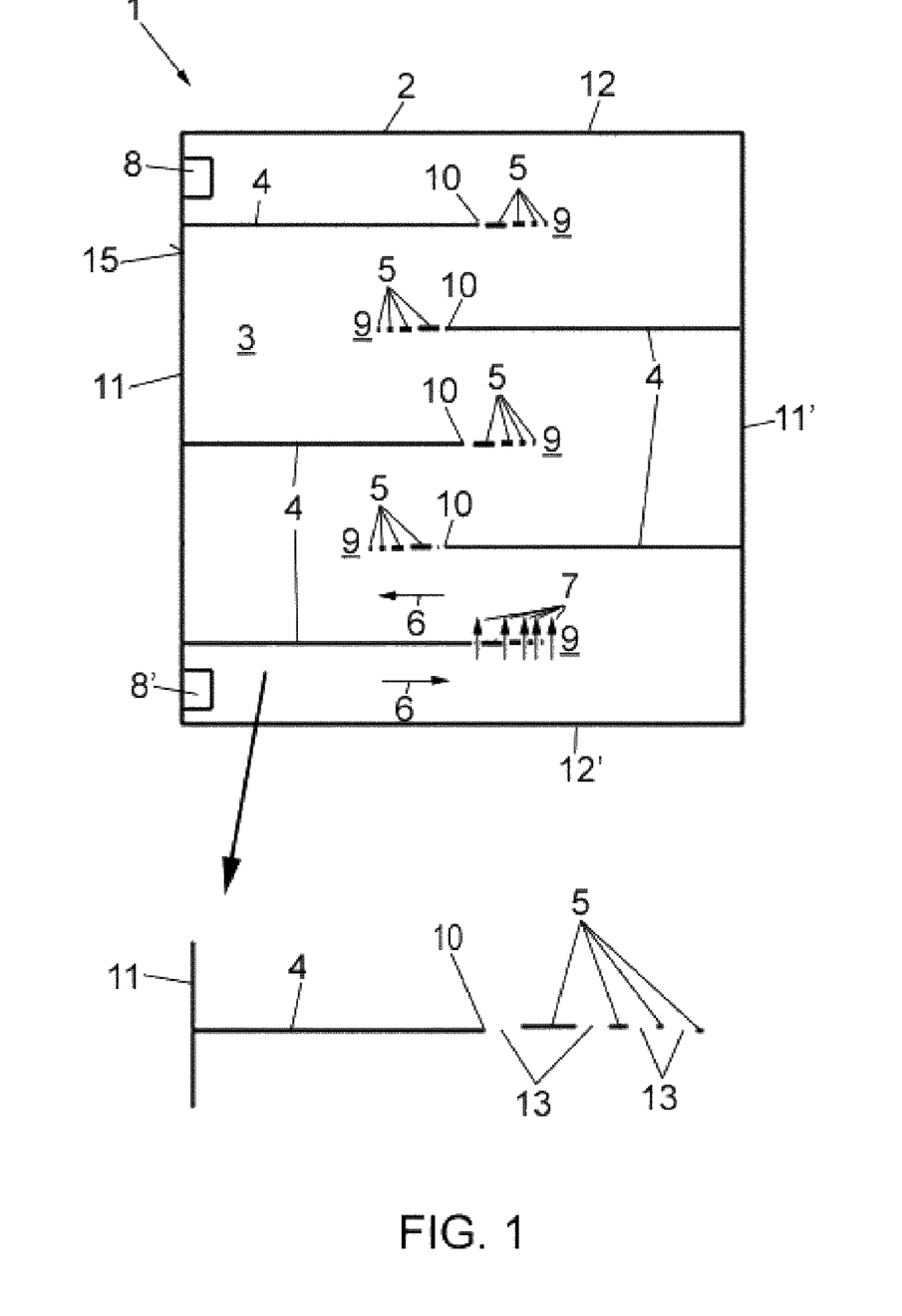
FIG. 1 a plastic film according to the invention with first and second separating zones in a top view.

Reference is now made to FIG. 1, in which an embodiment of a plastic film according to the invention, referred to as a whole by reference number 1, is depicted. FIG. 1 depicts the plastic film 1 in an overall representation (top), as well as an enlarged detail thereof (bottom).

According to it, the plastic film 1 comprises a film surface 2, onto which an electrically conductive heating layer 3 is applied substantially over its entire surface. A plastic, here, for example, PET, is used as material for the plastic film 1. In general, any material with sufficient chemical resistance, suitable shape and size stability, as well as, as the case may be, adequate optical transparency can be used for the film 1.

The heating layer 3 includes an electrically conductive material. Generally speaking, the selection of the heating layer 3 is not restricted to one specific material so long as a flat electrical heater can be realized with this material. Examples for this are metals with high electrical conductivity, such as titanium, manganese, indium, chromium, silver, copper, gold, aluminum, or molybdenum, metal alloys such as silver alloyed with palladium, as well as transparent, conductive oxides (TCOs). TCOs are preferably indium tin oxide, fluoride-doped tin dioxide, aluminum-doped tin dioxide, gallium-doped tin dioxide, boron-doped tin dioxide, tin zinc oxide, or antimony-doped tin dioxide. The heating layer 3 can consist of one conductive individual layer or a layer structure that includes at least one conductive sublayer. For example, such a layer structure includes at least one conductive sublayer, preferably silver (Ag), and other sublayers, such as antireflection and blocker layers. The layer thickness of the heating layer 3 can vary widely, with the thickness at every point being, for example, in the range from 0.1 nm to 100 µm. In the case of TCOs, the layer thickness is, for example, in the range from 100 nm to 1.5 µm, preferably in the range from 150 nm to 1 µm, and even more preferably in the range from 200 nm to 500 nm. For example, the layer thickness of a titanium layer is in the range from 0.1 to 2 nm; the layer thickness of a manganese layer, in the range from 0.1 to 1 nm; the layer thickness of a molybdenum layer, in the range from 0.1 to 1 nm; the layer thickness of a silver layer, in the range from 1 to 50 nm; the layer thickness of an indium layer, in the range from 50 to 200 nm; the layer thickness of a gold layer, in the range from 1 to 10 nm; and the layer thickness of a chromium layer is, for example, ca. 1 nm. The sheet resistance of the heating layer 3 is, for example, less than 20 ohm and is, in particular, in the range from 0.1 to 20 ohm. In the exemplary embodiment depicted, the sheet resistance of the heating layer 3 is, for example, in the range from 3 to 7 ohm.

The heating layer 3 is deposited on the plastic film 1 from the gas phase, for which purpose methods known per se, such as chemical vapor deposition (CVD) or physical vapor deposition (PVD), can be used. Preferably, the heating layer 3 is deposited on the plastic film 1 by sputtering (magnetron cathode sputtering).

If the plastic film 1 serves to heat a vehicle window, in particular a windshield, it must be adequately transparent to visible light in the wavelength range from 350 nm to 800 nm, with the term "transparency" understood to mean a high light transmittance of, for example, more than 80%. This can be obtained, in particular, by production from PET and a transparent heating layer 3 made of silver (Ag).

The plastic film 1 is, for example, implemented here in the shape of a rectangle, with the plastic film 1 having two opposing first film edges 11, 11' (here, for example, the longer film edges) and two opposing second film edges 12, 12' (here, for example, the shorter film edges). It is understood that the plastic film 1 can have any other shape suitable for the respective application.

As depicted in FIG. 1, the heating layer 3 is electrically divided by a plurality of rectilinear separating zones 4, 5, with a continuous meander-shaped or S-shaped main current path 6 between two connection electrodes 8, 8' being formed by the heating layer 3. The heating layer 3 can be heated by feeding a heating current to the connection electrodes 8, 8'. Here, the two connection electrodes 8, 8' are made, for example, of one and the same metal material, for example, copper or aluminum. The connection electrodes 8, 8' can be connected, via connection conductors (not shown), to the two terminals of a voltage source, for example, a battery or accumulator, in particular a vehicle battery, to provide a feed voltage. The voltage source can, for example, make available a feed voltage of 12 to 24 V, corresponding to a typical onboard voltage in combustion driven motor vehicles, or of more than 40 V, corresponding to a typical onboard voltage in electric vehicles. In particular, the heating layer 3 can be heated with a voltage in the range from 42 to 400 V. In the case of a panel heating element 1 for heating in the interior or exterior of a building, the voltage source can also be a central power supply with a mains voltage of, for example, 110 to 220 V.

In the plastic film 1, the separating zones 4,5 are produced by removal of the material of the heating layer 3, yielding, for example, V-shaped or U-shaped channels or recesses in the material of the heating layer 3. These channels can also be filled with an electrically insulating material. The removal of the heating layer 3 to form the separating zones 4,5 can, for example, occur mechanically, for instance, by cutting or grinding. Removal using a laser beam, which removes the material of the heating layer 3 in the separating zones 4,5, is preferred according to the invention.

In the context of the present invention, the term "separating zone" is generally understood to mean any region of the heating layer 3 that is suitable for separating two adjacent regions of the heating layer 3 from each other electrically such that a current flow via the separating zones is prevented. For this, the separating zones have, for example, an electrical resistance of more than 1 MΩ.

The heating layer 3 has rectilinear first separating zones 4 with a parallel arrangement. The first separating zones 4 extend alternatingly from the first film edge 11 or 11' to the opposing first film edge 11 or 11, ending freely in each case with a zone end 10 inside the heating layer 3, without reaching the opposing first film edge. This forms a meander-shaped or S-shaped main current path 6 in the heating layer 3. Generally speaking, "zone end 10" is understood to mean any edge or corner of a first separating zone 10 that protrudes into the surface region of the heating layer 3 and causes the main current path 6 to change its direction of flow inside the heating layer 3. In other words, the zone ends 10 represent, in each case, reversal points, at which the heating current changes its direction of flow, here, for example, by 180°.

In the embodiment depicted in FIG. 1, rectilinear second separating zones 5 are arranged, in each case, in an aligned extension of the first separating zones 4, which second separating zones 5 serve to interrupt the current flow in these regions. In the exemplary embodiment, four second separating zones 5 are, for example, associated with one and the same zone end 10 of a first separating zone 4. In each case, material of the heating layer 3 is situated between the separating zones 4, 5 such that a plurality (in this case, e.g., four) of through holes 13 for the heating current are formed. Consequently, the main current path 6 is divided in the region of any zone end 10 into a plurality (in this case, five) of current subpaths 7, with the heating current guided through the current subpaths 7 at least in sections around the free zone ends 10. Breaking down the main current path 6 into multiple current subpaths 7 has the effect that, at the zone ends 10, the heating current is distributed over a larger area of the heating layer 3 compared to the conventional plastic film 101 of FIG. 4. Thus, in particular, a local concentration of the current density can be avoided such that the current flow in the heating layer 3 is homogenized and the occurrence of local areas of heating (hot spots) is prevented. In the exemplary embodiment depicted, the second separating zones 5 are implemented shorter the farther they are from the free zone end 10. The width of the through holes 13 measured in an aligned extension of the first separating zone 4 decreases in the direction toward the zone end 10, by means of which a particularly good homogenization of the current density distribution can be obtained. The first and second separating zones 4, 5 can be produced in a particularly simple and economical manner in industrial series production, with, for this purpose, a laser head guided rectilinearly over the heating layer 3 and switched on intermittently to create a separating zone 4, 5.

Figure 2:
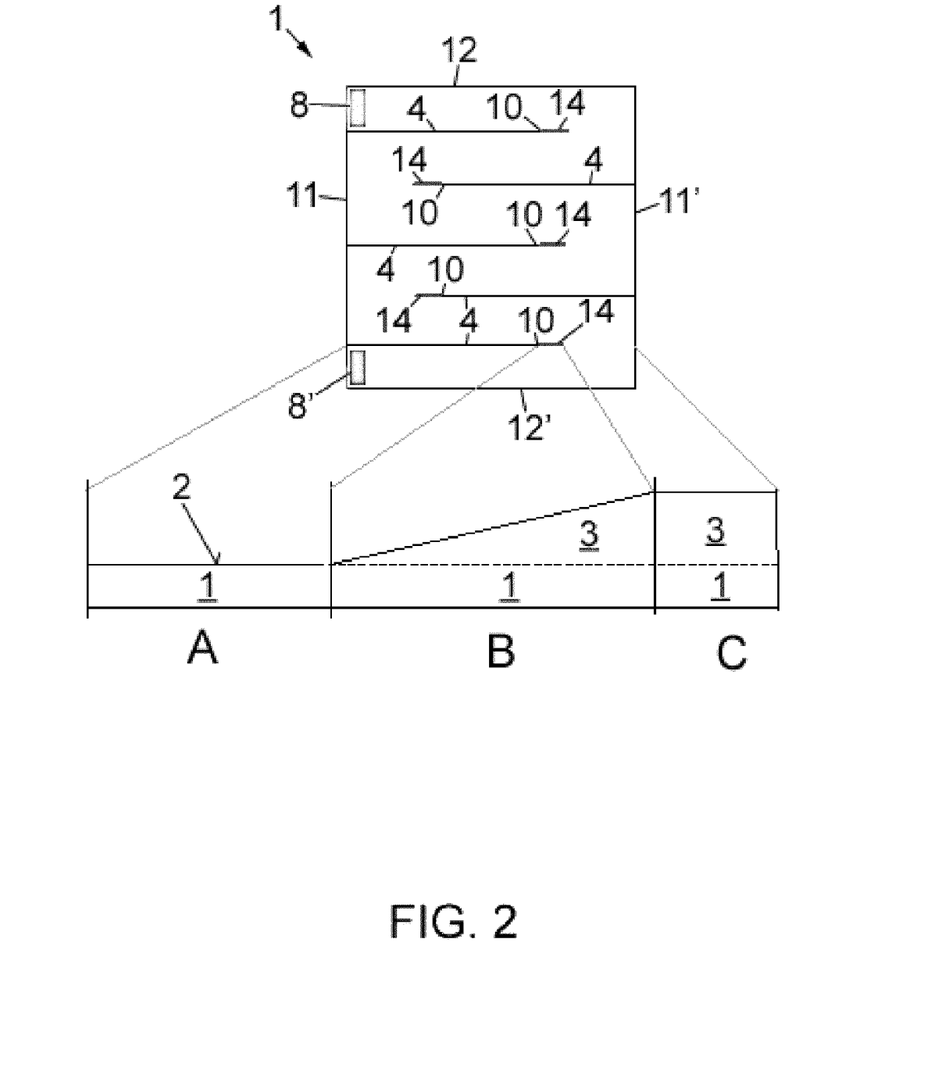
FIG. 2 the plastic film of FIG. 1 with additional transition zones in a top view and in a cross-sectional view.

FIG. 2 depicts another embodiment of the plastic film 1 of FIG. 1. To avoid unnecessary repetition, only the differences relative to the exemplary embodiment of FIG. 1 are explained, and, otherwise, reference is made to the statements made there.

According to it, a rectilinear transition zone 14 is arranged in an aligned extension of the rectilinear first separating zone 4 in each case on the free zone ends 10, with the transition zone 14 immediately following the first separating zone 4. However, it is also conceivable for the transition zones 14 to have a different orientation and arrangement relative to the associated first separating zone 4. The transition zones 14 are implemented in each case by reducing the layer thickness of the heating layer 3 in the direction toward the zone end 10. By means of the reduction of the layer thickness of the heating layer 3, the conductivity of the heating layer 3 is locally reduced and, thus, its electrical resistance is increased.

As is discernible from the enlarged cross-sectional view of FIG. 2 (section through the plastic film 1 along a first separating zone 4 and transition zone 14), the layer thickness of the heating layer 3 increases linearly in the transition zone 14 starting from the zone end 10 until the layer thickness of the heating layer 3 outside the first separating zone 4 is reached. Thus, the electrical conductivity in the transition zone 14 changes correspondingly, i.e., it decreases toward the zone end 10. As indicated, there is no heating layer 3 on the substrate 2 in the region of the first separating zone 4 (region A) such that an electrical connection is ruled out. In the region of the transition zone 14 (region B), the layer thickness of the heating layer 3 increases continuously and linearly, beginning from the free zone end 10 of the first separating zone 4, by which means the conductivity of the transition zone 14 increases with the increasing distance from the free zone end 10. In the heating layer 3 (region C), there is an at least approx. constant layer thickness. Since a reduction in the electrical conductivity results in the fact that part of the current is shifted to a region of higher conductivity, a homogenization of the current flow at the zone end 10 can be achieved to prevent hot spots.

A variation of the layer thickness of the heating layer 3 in the transition zones 14 can, for example, occur by means of selective removal, preferably using a laser, with a specific amount of material of the heating layer removed depending on the selected energy density of the laser point on the heating layer 3. However, alternatively, other laser parameters could be suitably adapted such as, for instance, power, frequency, pulse length, laser beam shape, or repetition rate. Suitable wavelengths of the laser can, for example, be 355 nm, 532 nm, or 1064 nm. Moreover, with the use of a controllable and movable laser head, it is possible to obtain a varied removal by adapting the movement of the laser point, for example, by changing the speed or acceleration of the laser point. In order to obtain a desired removal depth of the heating layer 3, the above mentioned methods can be used in any combination. The selection of parameters and of the laser used depends on the material of the heating layer 3 to be structured. In principle, for removal of the heating layer 3 and production of a layer thickness gradient, other methods can even be used, for example, mechanical or chemical methods. A chemical method for removal of the heating layer 3 could, for example, have an etching step.

Advantageously, the transition zone 14 has a length measured in an aligned extension of the first separating zone 4 that corresponds to at least twice the width of the main current path, by which means it can be accomplished that, in the region of the transition zone 14, a particularly uniform current distribution is present and the creation of hot spots can be reliably and safely counteracted.

Instead of a reduction of the layer thickness of the heating layer 3, the transition zone 14 can, generally speaking, also be formed by all suitable measures that are capable of changing the electrical conductivity of the heating layer 3 in the region of the free zone end 10 in the desired manner, for example, by changing the porosity of the heating layer or adding impurities or dopants to the heating layer 3.

In the transition zones 14, the second separating zones 5 are in each case arranged distributedly (not depicted in detail in FIG. 2). Here, the end of the second separating zone 5 farthest away from the free zone end 10 turned away from the free zone end 10 is situated at the end of the transition zone 14.

Overall, a still better homogenization of the current flow around the free zone ends 10 can be achieved through the combination of second separating zones 5 and transition zones 14.

Figure 3A:
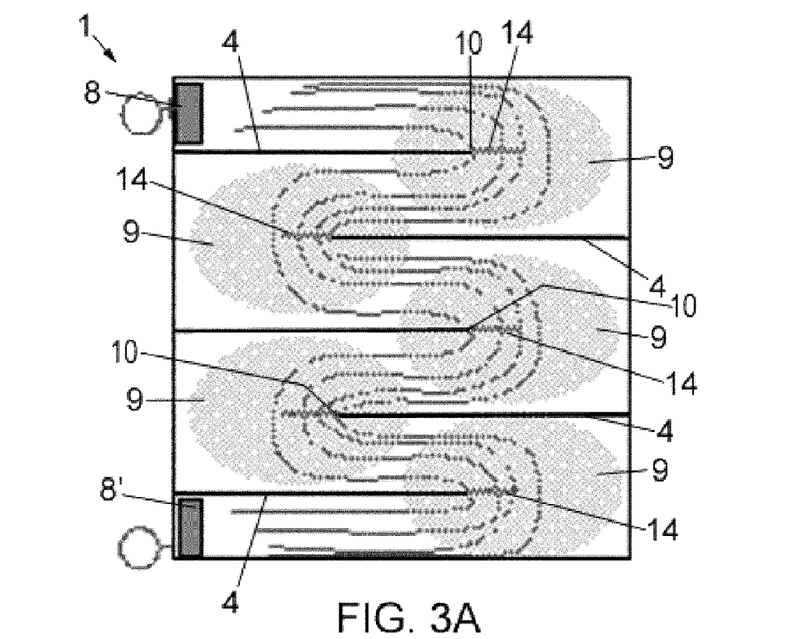
Figure 3B:
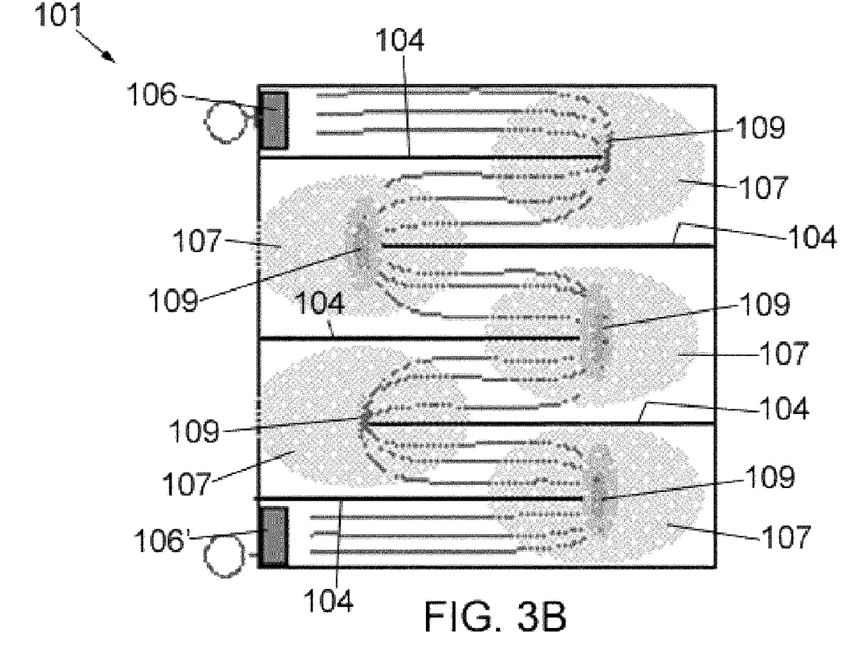

FIG. 3A depicts the embodiment of FIG. 2, with the main current path 6 represented by current lines. According to it, concentration of the current flow at the free zone ends 10 in the region of a curve of the current path 6 is prevented by a change of the electrical conductivity in the transition zones 14, by means of which the occurrence of hot spots can be counteracted. Compared to this, FIG. 3B illustrates a corresponding situation in the conventional plastic film 101 of FIG. 4. According to it, the current flow concentrates in the region of the free zone ends 10 of the separating zones 104, by means of which the temperature in these regions increases greatly, resulting in a nonuniform heat distribution in the plastic film 101 and in the occurrence of hot spots 109.

LIST OF REFERENCE CHARACTERS

1 plastic film
2 film surface
3 heating layer
4 first separating zone
5 second separating zone
6 main current path
7 current subpath
8, 8' connection electrode
9 change zone
10 zone end
11, 11' first film edge
12, 12' second film edge
13 through hole
14 transition zone
101 plastic film
102 film surface
103 heating layer 104 separating zone
105 current path
106, 106' connection electrode
107 change zone
108 zone end
109 hot spot

The invention claimed is:

1. A carrier for panel heating elements, in particular plastic film, with an electrical heating layer applied to at least a part of a carrier surface and with at least two electrodes provided for connection to a voltage source, wherein the at least two electrodes are connected to the electrical heating layer such that a current path for a heating current is formed between the electrodes, wherein the heating layer is electrically divided by:
one or more first separating zones, which have, in each case, at least one free zone end, and are implemented such that the current path changes its direction of flow on the free zone ends, and
one or more second separating zones, which are implemented such that the current path changing its direction of flow on the free zone ends is divided at least in sections into a plurality of electrically parallel current subpaths,
wherein one or more second separating zones are associated with at least one free zone end of a first separating zone, and are arranged in an aligned extension of the first separating zone.

2. The carrier according to claim 1, wherein the separating zones have a distance between them that becomes smaller toward the free zone end.

3. The carrier according to claim 1, wherein the second separating zones associated with the free zone end are implemented such that the electrically parallel current subpaths have, on the free zone end, an at least approximately equal electrical resistance.

4. The carrier according to claim 1, wherein a transition zone, in which the electrical conductivity of the electrical heating layer decreases toward the free zone end, adjoins the free zone end of the at least one first separating zone, with which the one or more second separating zones are associated.

5. The carrier according to claim 4, wherein in the transition zone, a layer thickness of the electrical heating layer decreases toward the free zone end.

6. The carrier according to claim 4, wherein in the transition zone, a porosity of the electrical heating layer increases toward the free zone end.

7. The carrier according to claim 4, wherein the electrical heating layer has a dopant to increase the electrical conductivity, with a concentration of the dopant in the transition zone decreasing toward the free zone end.

8. The carrier according to claim 4, wherein the electrical heating layer has a dopant to reduce the electrical conductivity, with a concentration of the dopant in the transition zone increasing toward the free zone end.

9. A panel heating element, with at least one substrate with a substrate surface on which the carrier, in particular a plastic film, according to claim 1 is applied.

10. A method for producing an electrically heatable carrier, in particular plastic film, comprising:
providing a carrier, on which an electrical heating layer is applied on at least a part of a film surface and which has at least two electrodes provided for connection to a voltage source, wherein the electrodes are connected to the electrical heating layer such that a current path for a heating current is formed between the electrodes;
electrically dividing the electrical heating layer by one or more first separating zones, with the separating zones having, in each case, at least one free zone end and being implemented such that the current path changes its direction of flow at the free zone ends; and
electrically dividing the electrical heating layer by one or more second separating zones, which are implemented such that the current path changing its direction of flow on the free zone ends is divided at least in sections into a plurality of electrically parallel current subpaths, wherein the one or more second separating zones are associated with the at least one free zone end of a first separating zone, with the second separating zones arranged in an aligned extension of the first separating zone.

11. A method comprising:
using the carrier, in particular a plastic film, according to claim 1 for an electrical heating of a functional individual piece and a built-in part in furniture, devices, and buildings as well as in means of transportation for travel on land, in the air, or on water.

12. The method according to claim 11 wherein the electrical heating of a functional individual piece and a built-in part in furniture, devices and buildings is electrical heating of heating elements in residential spaces.

13. The method according to claim 12, wherein the heating elements in residential spaces are wall mountable or free-standing heating elements.

14. The method according to claim 11, wherein the means of transportation for travel is a motor vehicle.

15. The method according to claim 11, wherein the functional individual piece and the built-in part in means of transportation for travel is a windshield, rear window, side window, and/or glass roof.

* * * * *